United States Patent
Barfoot et al.

(10) Patent No.: US 9,429,466 B2
(45) Date of Patent: Aug. 30, 2016

(54) DISTRIBUTED ACOUSTIC SENSING SYSTEMS AND METHODS EMPLOYING UNDER-FILLED MULTI-MODE OPTICAL FIBER

(71) Applicant: Halliburton Energy Services, Inc., Duncan, OK (US)

(72) Inventors: David A. Barfoot, Houston, TX (US); John L. Maida, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 307 days.

(21) Appl. No.: 14/068,448

(22) Filed: Oct. 31, 2013

(65) Prior Publication Data

US 2015/0114127 A1    Apr. 30, 2015

(51) Int. Cl.
*G01H 9/00* (2006.01)
*G01V 1/22* (2006.01)
*G01V 1/40* (2006.01)

(52) U.S. Cl.
CPC .............. *G01H 9/004* (2013.01); *G01V 1/226* (2013.01); *G01V 1/40* (2013.01)

(58) Field of Classification Search
CPC ......... G01H 9/004; G01V 1/226; G01V 1/40
USPC .......................................................... 73/655
See application file for complete search history.

(56) References Cited

U.S. PATENT DOCUMENTS 5,037,172 A    8/1991 Hekman et al.
6,402,390 B1 *    6/2002 Anderson .............. G02B 6/266
                                                     385/71
6,522,797 B1    2/2003 Siems et al.
6,591,025 B1    7/2003 Siems et al.
(Continued)

FOREIGN PATENT DOCUMENTS

GB          2473371        6/2012
WO       2015/065667       5/2015

OTHER PUBLICATIONS

Kalia, Nitika et al., "Downhole Treatment Monitoring Systems and Methods Using Ion Selective Fiber Sensors", U.S. Appl. No. 13/717,979, filed Dec. 18, 2012, 23 pgs.
(Continued)

*Primary Examiner* — J M Saint Surin
(74) *Attorney, Agent, or Firm* — Krueger Iselin LLP; Benjamin Fite

(57) ABSTRACT

An illustrative distributed acoustic sensing system includes a multi-mode optical fiber cable for distributed sensing and a distributed acoustic sensing interrogator coupled to the multi-mode optical fiber cable via a single mode optical fiber. The interrogator derives distributed acoustic measurements from Rayleigh backscattering light that is initiated with a substantially under-filled launch configuration that is designed to excite only the lowest-order modes of the multi-mode optical fiber. Mode conversion within the multi-mode optical fiber is anticipated to be negligible. For elastic scattering (i.e., Rayleigh scattering), it is further anticipated that the scattered light will be primarily returned in the incident propagation mode, thereby escaping the extraordinarily large coupling loss that would otherwise be expected from coupling a single-mode optical fiber to a multi-mode optical fiber for distributed sensing. Experiments with graded index multi-mode optical fiber have yielded positive results.

15 Claims, 3 Drawing Sheets

(56) References Cited

U.S. PATENT DOCUMENTS

| | | |
|---|---|---|
| 6,731,389 B2 | 5/2004 | Luscombe et al. |
| 6,931,188 B2 | 8/2005 | Kersey et al. |
| 6,996,264 B2 | 2/2006 | Hauck et al. |
| 7,139,422 B2 | 11/2006 | Hauck et al. |
| 7,628,531 B2 * | 12/2009 | Lee ................ G01K 11/32 374/1 |
| 7,641,395 B2 | 1/2010 | Ringgenberg et al. |
| 7,669,440 B2 | 3/2010 | Kersey et al. |
| 8,494,322 B2 | 7/2013 | Kersey et al. |
| 9,075,155 B2 | 7/2015 | Luscombe et al. |
| 2002/0168139 A1 | 11/2002 | Clarkson et al. |
| 2004/0113104 A1 | 6/2004 | Maida |
| 2004/0141420 A1 | 7/2004 | Hardage et al. |
| 2004/0163809 A1 | 8/2004 | Mayeu et al. |
| 2006/0018611 A1 | 1/2006 | Maida |
| 2006/0215974 A1 | 9/2006 | Maida |
| 2007/0272406 A1 | 11/2007 | McCoy et al. |
| 2008/0073084 A1 | 3/2008 | Ringgenberg et al. |
| 2009/0080835 A1 * | 3/2009 | Frith ................ G02B 6/14 385/50 |
| 2009/0326826 A1 | 12/2009 | Hull et al. |
| 2011/0116099 A1 | 5/2011 | Spross et al. |
| 2011/0308788 A1 | 12/2011 | Ravi et al. |
| 2012/0013893 A1 | 1/2012 | Maida |
| 2012/0105826 A1 | 5/2012 | Kalar et al. |
| 2012/0127459 A1 | 5/2012 | Handerek |
| 2012/0205103 A1 | 8/2012 | Ravi et al. |
| 2012/0250722 A1 | 10/2012 | Barfoot et al. |
| 2012/0257475 A1 | 10/2012 | Luscombe et al. |
| 2013/0056197 A1 | 3/2013 | Maida et al. |
| 2013/0056202 A1 | 3/2013 | Maida et al. |
| 2013/0087328 A1 | 4/2013 | Maida et al. |
| 2013/0245947 A1 | 9/2013 | Samson et al. |
| 2013/0249705 A1 | 9/2013 | Sharp et al. |

OTHER PUBLICATIONS

Ravi, Kris et al., "Downhole Fluid Tracking with Distributed Acoustic Sensing", U.S. Appl. No. 13/726,054, filed Dec. 22, 2012, 24 pgs.

Samson, Etienne M., et al., "Fiberoptic Systems and Methods for Acoustic Telemetry", U.S. Appl. No. 13/758,465, filed Feb. 4, 2013, 15 pgs.

Samson, Etienne M., et al., "Remote Work Methods and Systems Using Nonlinear Light Conversion", U.S. Appl. No. 13/722,623 filed 12/20/21, 24 pgs.

Skinner, Neal G., et al., "Downhole Time Domain Reflectometry with Optical Components", U.S. Appl. No. 13/655,607, filed Oct. 19, 2012, 32 pgs.

"International Preliminary Report on Patentability", dated Nov. 2, 2015, "Distributed Acoustic Sensing Systems and Methods Employing Under-Filled Multi-Mode Optical Fiber", Appl No. PCT/US2014/059631 filed Oct. 8, 2014, 16 pgs.

"PCT International Search Report and Written Opinion", dated Jan. 22, 2015, Appl No. PCT/US2014/059631, "Distributed Acoustic Sensing Systems and Methods Employing Under-Filled Multi-Mode Optical Fiber", filed Oct. 8, 2014, 12 pgs.

* cited by examiner

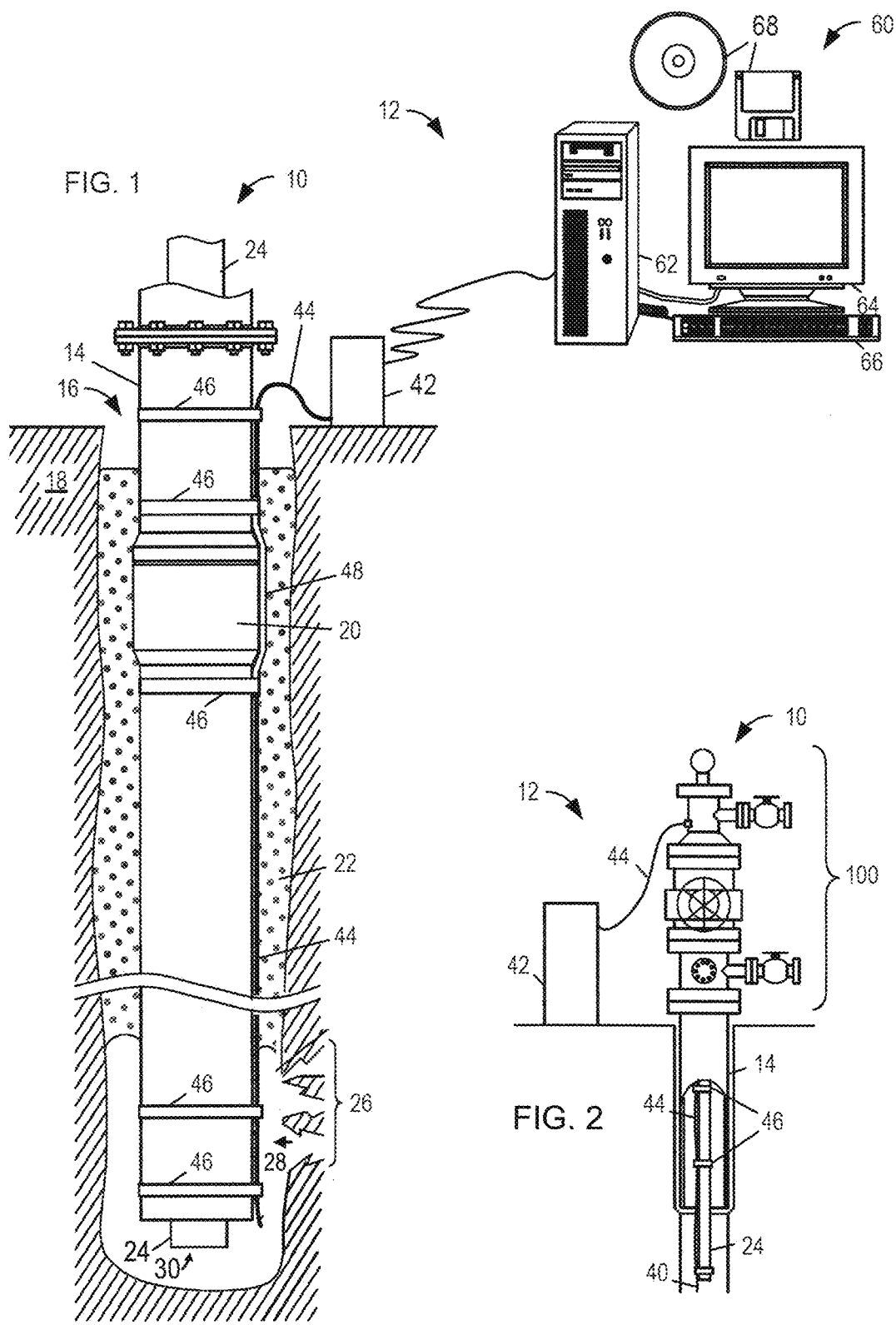

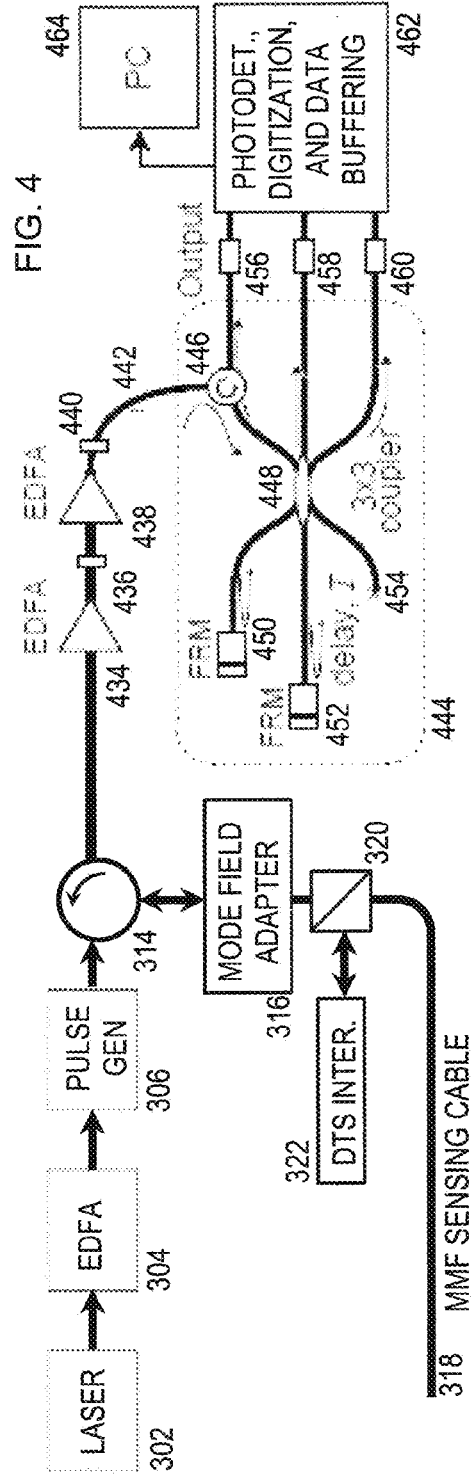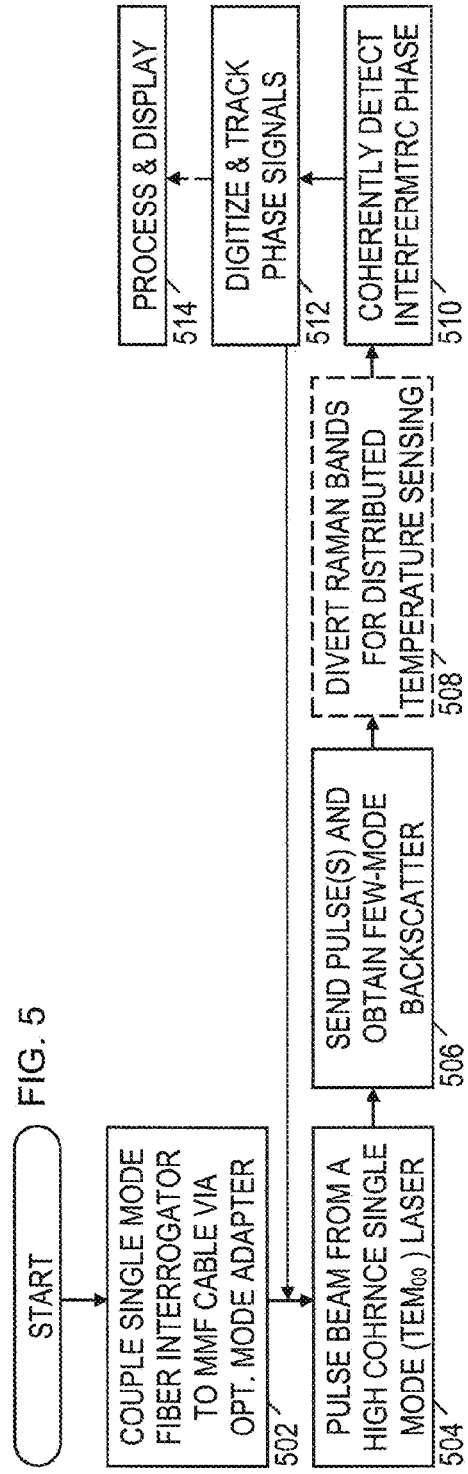

DISTRIBUTED ACOUSTIC SENSING SYSTEMS AND METHODS EMPLOYING UNDER-FILLED MULTI-MODE OPTICAL FIBER

BACKGROUND

Distributed optical sensing technology is turning out to be suitable for a number of downhole applications ranging from temperature sensing to passive seismic monitoring. As engineers develop new and improved systems to increase performance and sensitivity, they have encountered certain obstacles. For example, recent distributed acoustic sensing system designs specify the use of single-mode optical fiber to achieve adequate sensing performance, yet many existing well installations employ multi-mode optical fiber, which would be largely infeasible to replace. The inventors are unaware of any existing system that exploits multi-mode optical fiber for distributed acoustic sensing.

BRIEF DESCRIPTION OF THE DRAWINGS

Accordingly, there are disclosed in the drawings and the following description various systems and methods that employ an under-filled launch configuration to exploit a multi-mode fiber for distributed acoustic sensing. In the drawings:

FIG. 1 shows an illustrative distributed acoustic sensing system in a production well.

FIG. 2 shows an alternative distributed acoustic sensing system embodiment.

FIG. 4 shows an illustrative homodyne system with an under-filled launch configuration.

FIG. 5 is a flowchart of an illustrative distributed acoustic sensing method employing a multi-mode optical fiber for sensing.

Figure 3:
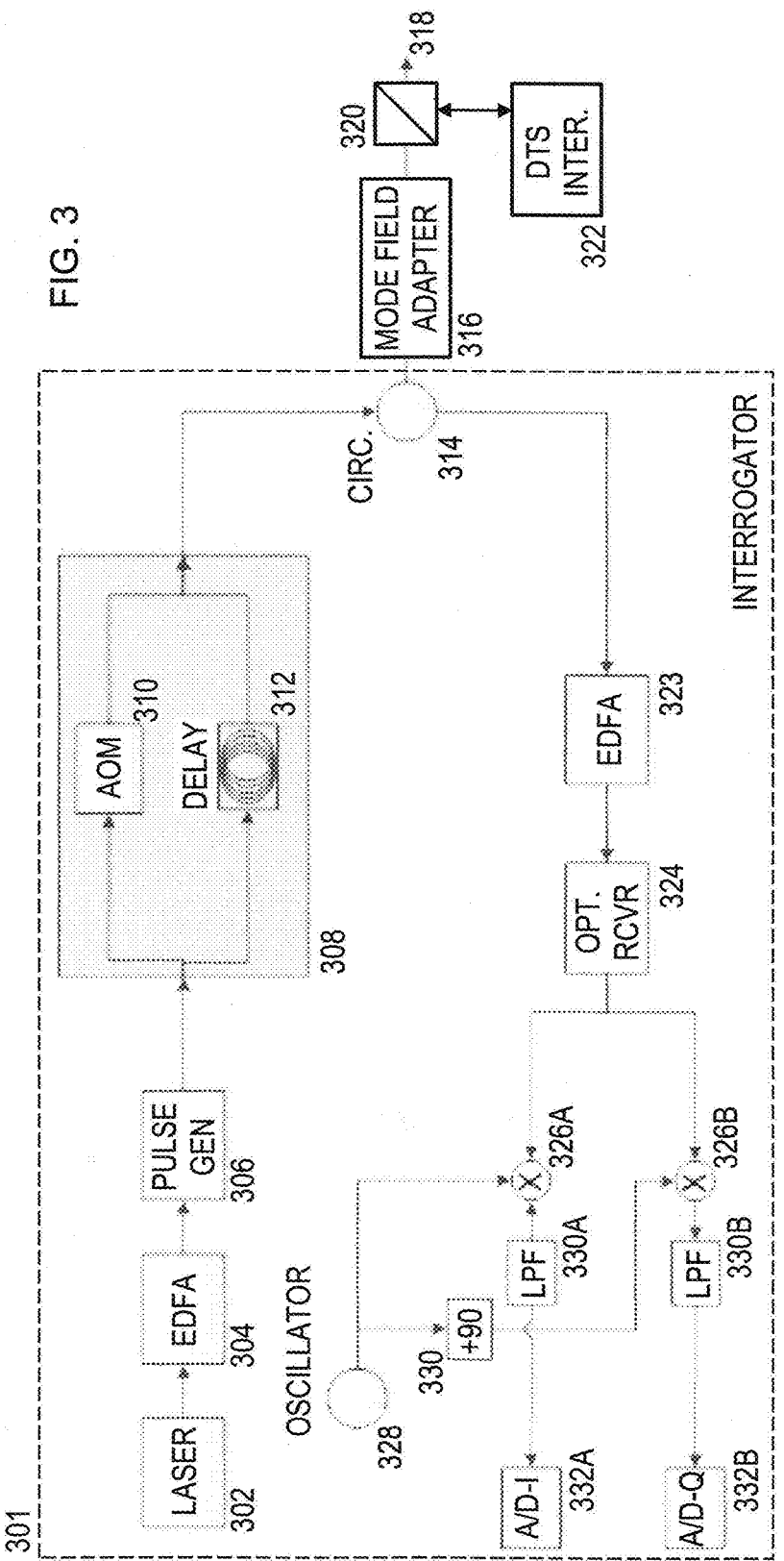
FIG. 3 shows an illustrative heterodyne system with an under-filled launch configuration.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Certain disclosed system and method embodiments employ an under-filled multi-mode optical fiber for distributed interferometric phase sensing applications in the downhole environment. Many existing cable installations for distributed temperature sensing ("DTS") in borehole environments and other asset monitoring applications employ graded index multi-mode fiber. The inventors have discovered that, contrary to accepted wisdom, many of the advantages provided by the use of a single-mode optical fiber for sensing (including coherency preservation and minimal dispersion) can also be achieved with multi-mode optical fiber for sensing, so long as the system employs an under-filled launch configuration to excite only the lowest-order modes in the multi-mode optical fiber.

This approach further enables a single distributed sensing interrogator design for sensing with both single-mode and multi-mode optical fibers, without the extraordinarily high coupling losses that would generally be expected to occur in connections between multi-mode optical fibers and single-mode optical fibers. As an illustrative example, a splice between a typical filled multi-mode optical fiber (having a core diameter of 50 microns) and a typical single-mode optical fiber (having a core diameter of 8 microns) would exhibit a theoretical transmission loss of approximately 16 dB, making it infeasible to analyze the weak optical signals typical of distributed sensing. The disclosed systems are suitable for detection of distributed acoustical and vibrational energies (DAS/DVS).

Turning now to the figures, FIG. 1 shows a well 10 equipped with an illustrative embodiment of a distributed downhole sensing system 12. The well 10 shown in FIG. 1 has been constructed and completed in a typical manner, and it includes a casing string 14 positioned in a borehole 16 that has been formed in the earth 18 by a drill bit. The casing string 14 includes multiple tubular casing sections (usually about 30 foot long) connected end-to-end by couplings. One such coupling is shown in FIG. 1 and labeled '20.' Within the well 10, cement 22 has been injected between an outer surface of the casing string 14 and an inner surface of the borehole 16 and allowed to set. A production tubing string 24 has been positioned in an inner bore of the casing string 14.

The well 10 is adapted to guide a desired fluid (e.g., oil or gas) from a bottom of the borehole 16 to a surface of the earth 18. Perforations 26 have been formed at a bottom of the borehole 16 to facilitate the flow of a fluid 28 from a surrounding formation into the borehole and thence to the surface via an opening 30 at the bottom of the production tubing string 24. Note that this well configuration is illustrative and not limiting on the scope of the disclosure.

The downhole optical sensor system 12 includes an interface 42 coupled to a multi-mode optical fiber cable 44 for distributed downhole sensing. The interface 42 is located on the surface of the earth 18 near the wellhead, i.e., a "surface interface". In the embodiment of FIG. 1, the multi-mode optical fiber cable 44 extends along an outer surface of the casing string 14 and is held against the outer surface of the of the casing string 14 at spaced apart locations by multiple bands 46 that extend around the casing string 14. A protective covering may be installed over the multi-mode optical fiber cable 44 at each of the couplings of the casing string 14 to prevent the cable from being pinched or sheared by the coupling's contact with the borehole wall. In FIG. 1, a protective covering 48 is installed over the multi-mode optical fiber cable 44 at the coupling 20 of the casing string 14 and is held in place by two of the bands 46 installed on either side of coupling 20.

In at least some embodiments, the multi-mode optical fiber cable 44 terminates at surface interface 42 with an optical port adapted for coupling the multi-mode optical fiber cable to a distributed sensing interrogator having a light source and a detector. (In the illustrated embodiment, the interrogator is assumed to be part of the interface 42 and is not shown separately in the figure. In practice, the interrogator may be a separate portable unit removably coupled to the interface 42.) The light source transmits light pulses along the multi-mode optical fiber cable 44, which contains scattering impurities. As the pulse of light propagates along the fiber, some of the pulse energy is scattered back along the fiber from every point on the fiber. The optical port communicates the backscattered light to the detector, which responsively produces electrical measurements of differences in backscattered light phase at each point in the fiber. As will be explained in greater detail below, the interrogator employs an under-filled launch configuration to excite only the lowest-order modes in the multi-mode optical fiber.

The illustrative downhole optical sensor system 12 of FIG. 1 further includes a computer 60 coupled to the surface interface 42 to control the interrogator and obtain distributed sensing measurements. The illustrated computer 60 includes a chassis 62, an output device 64 (e.g., a monitor as shown in FIG. 1, or a printer), an input device 66 (e.g., a keyboard), and information storage media 68 (e.g., magnetic or optical data storage disks). However, the computer may be implemented in different forms including, e.g., an embedded computer permanently installed as part of the interrogator, a portable computer that is plugged into the interrogator as desired to collect data, and a remote desktop computer coupled to the interrogator via a wireless link and/or a wired computer network. The computer 60 is adapted to receive the digitized measurement signals produced by the interrogator and to responsively determine a distributed parameter such as, e.g., distributed acoustic sensing along the length of the casing string.

The computer may be configured for application specific operation by software stored, for example, on the information storage media 68 for execution by computer 60. The instructions of the software program may cause the computer 60 to collect phase differences of backscattered light derived from the electrical signal from surface interface 42 and, based at least in part thereon, to determine downhole parameters such as acoustic signals at each point on the fiber 44. The instructions of the software program may also cause the computer 60 to display the acoustic waveforms or envelopes associated with each point on the fiber via the output device 64. The software may further provide a user interface that enables the user to configure operation of the interrogator including, for example, pulse width, pulse spacing, and measurement sampling rates.

FIG. 2 shows an alternative embodiment of downhole optical sensor system 12 having the multi-mode optical fiber cable 44 strapped to the outside of the production tubing 24 rather than the outside of casing 14. Rather than exiting the well 10 from the annular space outside the casing, the multi-mode optical fiber cable 44 exits through an appropriate port in the "Christmas tree" 100, i.e., the assembly of pipes, valves, spools, and fittings connected to the top of the well to direct and control the flow of fluids to and from the well. The multi-mode optical fiber cable 44 extends along the outer surface of the production tubing string 24 and is held against the outer surface of the of the production tubing string 24 at spaced apart locations by multiple bands 46 that extend around the production tubing string 24. The downhole optical sensor system 12 of FIG. 2 optionally includes a hanging tail 40 at the bottom of a borehole. In other system embodiments, the multi-mode optical fiber cable 44 may be suspended inside the production tubing 24 and held in place by a suspended weight on the end of the fiber.

FIG. 3 shows an illustrative distributed sensing system that employs an under-filled launch configuration for a multi-mode sensing fiber. In interrogator 301, a high coherence (ultra monochromatic) single transverse mode (TEM00) laser 302 emits a beam of coherent light. A gas laser (e.g., HeNe) may be preferred, though a erbium doped fiber laser or a vertical cavity surface emitting laser (VCSEL) may be acceptable alternatives. An optional erbium-doped fiber amplifier (EDFA) 304 amplifies the signal. A pulse generator 306 turns the beam into pulses with an adjustable width and adjustable spacing. An illustrative pulse width of 1 nanosecond would offer a spatial resolution of about 1 foot, and an illustrative pulse spacing of 0.1 milliseconds would offer a sampling rate of 10 kHz on a 10 kilometer fiber. These values can be tailored to the particular details of each installation.

Compensator 308 converts each pulse into a double pulse, using a dual path system with a delay coil 312 in one path and an acousto-optic modulator (AOM) 310 in the other path. The modulator 310 provides a frequency shift, so that the two pulses exiting the compensator 308 are at slightly different frequencies. A circulator 314 directs the interrogating beam to a coupling 316 with a multi-mode optical fiber, and returns backscattered light received via the coupling 316 to an EDFA 323 which amplies the signal prior to its conversion to an electrical signal by a photodetector or other form of optical receiver 324.

The backscattered light is a combination of light from the two pulses scattered from different points on the fiber 318. The frequency difference of the dual pulses creates a beat frequency in the combined backscatter. An oscillator 328 is tuned to demodulate this beat frequency to baseband in-phase and quadrature-phase signals. Multipliers 326A, 326B each take the product of the electrical beat frequency signal and the oscillator signal, with multiplier 326B employing a 90°-shift on the oscillator signal. Lowpass filters 330A and 330B forward the baseband component of the product signals to respective analog-to-digital converters 332A, 332B. Based on the time lag from each pulse signal launch, the digitized in-phase and quadrature-phase measurements are associated with a spatial position ("channel") on the fiber, and tracked as a function of pulse number to obtain a time-dependent measurement of channel phase, from which a corresponding acoustic signal can be readily determined. The optical phase of the returned light changes as the relevant portion of the fiber is stretched or compressed.

A computer collects the channel measurements from the analog-to-digital converters 332 and processes the in-phase and quadrature-phase components to determine and track phase. Abbreviating the in-phase signal as "I" and the quadrature-pase signal as "Q", we have the following relations $$I = \cos(\text{phase})$$

$$Q = \sin(\text{phase})$$

$$\text{phase} = \arctan(Q/I)$$

$$QF = I^2 + Q^2$$

where the quality factor ("QF") is a convenient representation of the channel noise level.

Though there are various acceptable optical path configurations within interrogator 301, ranging from single-mode optical fiber to free-space propagation, it is contemplated that the optical path will primarily comprise single-mode fiber, and in any event it is anticipated that the communication between the interrogator 301 and coupling 316 will be performed via single-mode fiber. The illustrated coupling 316 takes the form of a mode field adapter, but as explained further below it is expected that a standard splice will provide sufficient performance.

Coupling 316 provides an under-filled launch configuration for multi-mode optical fiber 318, meaning that the interrogating beam does not enter the high-order propagation modes supported by the multi-mode optical fiber, but rather enters only the lowest-order propagation modes. For maximum performance, it is desired to excite only the single lowest order mode of the multi-mode fiber. However, it is expected that adequate performance can nevertheless be achieved with excitation of multiple low order modes, though the reverse coupling loss is expected to increase with the number of excited modes. Coupling 316 can be a splice (e.g., a fusion splice), or something more complex such as a fiber taper or even a free-space optical device utilizing collimators, lenses, etc., that can function as a mode field adapter.

While some limited degree of mode conversion may be expected as the interrogating beam propagates along the multi-mode optical fiber 318, it is anticipated that this conversion will be negligible. Moreover, the scattering of light from the interrogating beam only occurs from those scattering centers that couple to that propagation mode. For elastic scattering (i.e., Rayleigh scattering), it is anticipated that the scattered light will be primarily returned in the propagation mode that initially coupled to the scattering center to cause the scattering. In other words, light elastically scattered from a given propagation mode may be expected to return in that propagation mode, particularly when dealing with low-order propagation modes. Again, as the backscattered beam propagates along the multi-mode fiber, mode conversion is anticipated to be negligible. Finally, as the coupler 316 communicates light into the single-mode fiber, a high coupling coefficient is anticipated for the lowest order propagation mode and perhaps for the few next-to-lowest order modes. (A mode field adapter may be employed to convert additional low-order modes in the multi-mode fiber to the fundamental propagation mode for the single-mode fiber.) Initial experiments, albeit with graded index multi-mode optical fiber, seem to support these expectations. Though graded index multi-mode optical fiber may be preferred as this type of fiber generally causes less mode dispersion, it is not expected to be necessary. Rather, it is believed that the proposed operating principles will similarly apply to step index multi-mode optical fibers and other types of multi-mode optical fibers including "holey" and "photonic crystal" multi-mode optical fibers.

Many existing distributed temperature sensing installations employ graded index multi-mode optical fiber for sensing. With the disclosed techniques, these existing installations can be readily adapted for distributed acoustic sensing. That is, the interrogator 301 may be configured to share an existing multi-mode fiber with a distributed temperature sensing interrogator 322 as shown in FIG. 3. As distributed temperature sensing is often preformed at a shorter wavelength than distributed acoustic sensing (e.g., 1064 nm versus 1550 nm), the two interrogators can operate in parallel without causing interference. A wavelength division multiplexer 320 may be provided to couple both interrogators to the sensing fiber. If some loss is acceptable, the multiplexer 320 can be replaced with a beam splitter. It is common for DTS systems to rely on inelastic (Raman) scattering rather than the elastic (Rayleigh) scattering being employed by interrogator 301.

The internal configuration of interrogator 301 is termed a heterodyne configuration. FIG. 4 shows an alternative, "homodyne" configuration. Components with functions similar to those of FIG. 3 are labeled similarly. The illustrated configuration lacks FIG. 3's compensator 308, so circulator 314 sends isolated light pulses (rather than the double-pulses generated by compensator 308) to the sensing fiber 318. Circulator 314 returns the backscattered light to optional EDFAs 434, 438, each of which is provided with a filter 436, 440 to block out-of-band noise. The amplified signal enters a combined 3×3 coupler/compensator unit 444 via an input 442. A second circulator 446 directs the input light into a 3×3 coupler 448. The light exits the coupler on three ports. Port 450 is coupled to a Faraday rotator mirror (FRM) that returns the light to port 450. Port 452 is coupled via a delay line to a second FRM, which returns the light to port 452 with an added delay. (The time delay causes light returning to ports 450 and 452 to be from different positions on the sensing fiber.) Port 454 is terminated with an absorber.

The light returning to ports 450 and 452 is combined by the 3×3 coupler to obtain an interference signal that is directed to output ports 456, 458, 460, with a 120° phase separation between the outputs. This interference signal enables an interference measurement between backscattered light from spaced-apart locations on the fiber. The three phase-separated output measurements can then be combined to determine the in-phase and quadrature components. Referring to the coupler outputs for a given wavelength as A, B, and C, we have the following relations:

$A = \text{Cos [Phase]}$ $B = \text{Cos [Phase−120°]}$ $C = \text{Cos [Phase+120°]}$ $I = \sqrt{3}(A-B)$ $Q = A+B-2C$ The calculation of phase and quality factor can then proceed as described previously.

Receiver electronics 462 convert the optical signals to electrical signals, which are then digitized and buffered for retrieval by a personal computer 464 or other form of data acquisition device. The signal phase can be determined for each spatial mode measurement and combined as outlined previously.

In both interrogator embodiments, the digitized signals are timed relative to the launched pulses to determine an associated position on the sensing fiber for each measurement. Moreover, the measurements are repeated to obtain a time-dependent measurement of interference phase, from which the system derives a distributed acoustic sensing signals.

FIG. 5 shows an illustrative method for employing a multi-mode optical fiber for distributed acoustic sensing. In block 502, a distributed acoustic sensing interrogator is coupled via a single-mode optical fiber to a multi-mode optical fiber that has been deployed in a borehole. In some embodiments, the coupling is performed with a mode field adapter.

In block 504, a pulse generator converts a beam from a high coherence, single transverse mode ($TEM_{00}$) into a pulse sequence with an adjustable pulse width and adjustable pulse spacing. In block 506, the system couples the pulses to low-order modes of the multi-mode optical fiber and receives Rayleigh backscattered light via the single-mode optical fiber from the multi-mode optical fiber. In block 508 optionally diverts inelastically scattered light to another interrogator for distributed temperature sensing.

In block 510, the system takes an interferometric signal and coherently measures its phase, both as a function of position along the sensing fiber, and as a function of pulse launch number. In block 512, the measurements are digitized and tracked. The method repeats blocks 504-512, communicating the measurements to a computer that, in block 514, derives acoustic signals for each of multiple positions along the fiber and displays the signals to a user. the it Th the beroptic cable is deployed in the borehole, either by being strapped to a tubing string as the tubing string is lowered into the borehole, or by being transported into place with a weighted end and/or frictional fluid flow. The deployment is completed by connecting the fiberoptic cable to an interface that enables the cable to be interrogated by distributed sensing electronics.

Taken as a whole, the distributed acoustic sensing display reveals a surprising amount of information about ongoing downhole processes, including fluid flows patterns, fluid flow compositions, chemical processes (including curing of cement), formation treatments, operations of mechanical components, and seismic survey signals. The disclosed systems and methods are expected to be widely valued for enabling such monitoring in existing optical fiber installations.

Numerous variations and modifications will become apparent to those skilled in the art once the above disclosure is fully appreciated. For example, the figures show system configurations suitable for production monitoring, but they are also readily usable for monitoring treatment operations, cementing operations, active and passive seismic surveys, and field activity monitoring. As used herein, the term "acoustic sensing" encompasses "vibration sensing" and "seismic sensing". It is intended that the following claims be interpreted to embrace all such variations and modifications.

What is claimed is:

1. A distributed sensing system that comprises:
   a multi-mode optical fiber cable deployed for distributed sensing;
   a distributed acoustic sensing interrogator having a single-mode optical fiber that communicates light from a single transverse mode laser source;
   a mode field adapter that couples the light from the single-mode optical fiber to the multi-mode optical fiber cable; and
   a distributed temperature sensing interrogator,
   wherein the distributed acoustic sensing interrogator derives distributed acoustic measurements from Rayleigh backscattered light received from the multi-mode optical fiber cable,
   wherein the distributed acoustic sensing interrogator receives the Rayleigh backscattered light from the multi-mode optical fiber cable via the single-mode optical fiber, and
   wherein the distributed temperature sensing interrogator is coupled to the multi-mode optical fiber cable to derive distributed temperature measurements from backscattered light on a fiber that also provides said backscattered light to the distributed acoustic sensing interrogator.

2. The system of claim 1, wherein the mode field adapter comprises a fiber taper.

3. The system of claim 1, wherein the mode field adapter comprises a free-space optical device.

4. The system of claim 1, wherein the multi-mode optical fiber cable has a graded index of refraction.

5. The system of claim 1, wherein the multi-mode optical fiber cable comprises at least one of a step index multi-mode fiber, a holey multi-mode fiber, and a photonic crystal fiber.

6. The system of claim 1, wherein the distributed temperature sensing interrogator provides light having a different wavelength than said light from said laser source.

7. The system of claim 6, further comprising a wavelength division multiplexer that couples the multi-mode optical fiber cable to both the distributed acoustic sensing interrogator and the distributed temperature sensing interrogator.

8. A distributed sensing method that comprises:
   coupling pulses from a laser source to a distributed sensing multi-mode optical fiber via a single-mode optical fiber and a mode field adapter;
   deriving distributed acoustic sensing measurements from Raleigh backscattered light received from the multi-mode optical fiber via the single-mode optical fiber; and
   determining distributed temperature measurements from backscattered light received from the multi-mode optical fiber,
   wherein said determining includes providing light of a different wavelength than said pulses to generate the backscattered light for the distributed temperature measurements.

9. The method of claim 8, wherein said coupling includes minimizing mode conversion within the multi-mode optical fiber by delivering light from the single-mode optical fiber in only a single transverse mode.

10. The method of claim 8, further comprising employing the mode field adapter to convert multiple propagation modes of backscattered light from the multi-mode optical fiber into one or more propagation modes suitable for the single-mode optical fiber.

11. The method of claim 8, wherein said coupling includes passing the pulses and the backscattered light across a splice between the single-mode optical fiber and the multi-mode optical fiber.

12. The method of claim 8, wherein the multi-mode optical fiber has a graded index of refraction.

13. The method of claim 8, wherein the multi-mode optical fiber comprises at least one of a step index multi-mode fiber, a holey multi-mode fiber, and a photonic crystal fiber.

14. The method of claim 8, further comprising separating the backscattered light for the distributed temperature measurements from the Rayleigh backscattered light using a wavelength division multiplexer.

15. A distributed sensing method that comprises:
   coupling pulses from a laser source to a distributed sensing multi-mode optical fiber via a single-mode optical fiber and a mode field adapter;
   deriving distributed acoustic sensing measurements from Raleigh backscattered light received from the multi-mode optical fiber via the single-mode optical fiber; and
   employing the mode field adapter to convert multiple propagation modes of backscattered light from the multi-mode optical fiber into one or more propagation modes suitable for the single-mode optical fiber.

* * * * *